(12) United States Patent
Kunze et al.

(10) Patent No.: US 6,735,164 B1
(45) Date of Patent: May 11, 2004

(54) ELECTRONIC DEVICE

(75) Inventors: Norbert Kunze, Diez (DE); Stefan Müller, Wetzlar (DE); Horst Rumpf, Herborn (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/674,668

(22) PCT Filed: Mar. 10, 2000

(86) PCT No.: PCT/JP00/02188

§ 371 (c)(1),
(2), (4) Date: Nov. 2, 2000

(87) PCT Pub. No.: WO00/54273

PCT Pub. Date: Sep. 14, 2000

(30) Foreign Application Priority Data

Mar. 11, 1999 (DE) .......................................... 199 10 671

(51) Int. Cl.[7] .............................. G11B 25/00; G11B 5/54
(52) U.S. Cl. ...................................... 369/270; 360/256.1
(58) Field of Search ................................ 369/270, 271, 369/275.1–275.6; 360/256.1–256.9

(56) References Cited

U.S. PATENT DOCUMENTS

| 5,031,169 A | * 7/1991 | Kato et al. ................... 369/270 |
| 5,054,016 A | * 10/1991 | d'Alayer et al. ............. 369/270 |
| 6,430,007 B1 | * 8/2002 | Jabbari ..................... 360/256.1 |

FOREIGN PATENT DOCUMENTS

| EP | 0892403 A1 | 1/1999 |
| JP | 08087803 A | 4/1996 |

* cited by examiner

*Primary Examiner*—Allen Cao
(74) *Attorney, Agent, or Firm*—Laurie E. Gathman

(57) ABSTRACT

A device for reading information stored on an information disc (2), and perhaps for writing information to the disc (2) as well. The device includes at least one position switch (1) for recognizing the position of the information disc (2), each position switch (1) comprising at least two detection elements for detecting two reference points disposed along the circumference of a circle whose center corresponds to the center of the information disc (2) when it is in a reference position.

20 Claims, 2 Drawing Sheets

ELECTRONIC DEVICE

BACKGROUND OF THE INVENTION

The invention relates to a device for reading information stored on an information disc, for writing information on an information disc, or for performing both functions. Such a device is known, for example, from the publication EP 0892403.

The term information disc here is understood to mean a plate-shaped data carrier, in particular a CD, CD-ROM, and DVD.

In the known device, a mechanical stop is provided against which the information disc is abutted during the loading process for the purpose of positioning the information disc above the turntable of a playback unit.

SUMMARY OF THE INVENTION

It is an object of the invention to provide a device of the kind mentioned in the opening paragraph, which renders possible an accurate positioning of an information disc on the turntable of a playback unit.

According to the invention, this object is achieved in that the device comprises at least one position switch for recognizing the position of the information disc, in that the position switch comprises at least two detection elements for scanning two mutually distanced reference points, and in that said reference points are arranged on the circumference of a circle whose center corresponds to the center of the information disc in a reference position.

It is possible that such a position sensor to detect the position of the information disc exactly in two dimensions and to position the information disc exactly in a desired location in two dimensions. In particular, the position sensor is suitable for an exact positioning of the information disc above the turntable of a playback unit. The reference position in this case is the center of the turntable.

The advantageous embodiment of the invention as defined in claim 2 is particularly inexpensive and simple to realize.

The optical solution as defined in claim 3 can be integrated into compact devices in a particularly space-saving manner. The optical contact pairs each form a photoelectric barrier. The photoelectric barrier is interrupted the moment the disc edge of the information disc reaches the relevant reference point.

The advantageous embodiment of the invention as defined in claim 4 has the advantage that the positions of the two reference rims with respect to one another can be manufactured with very narrow tolerance in stamping technology. The advantage of this construction is that the switching point can be maintained very accurately without adjustment.

The embodiment of the invention as defined in claim 5 has the advantage that the contacts still move relative to one another after closing. This achieves a self-cleaning effect of the contacts.

At the same time, the reference rims for the edge of the information disc must be kept fixedly positioned with respect to the center of the turntable. To achieve this, the reference rims are rigidly fastened in the housing of the switch, whereas the contacts are fastened to resilient spring arms.

The embodiment of the invention as defined in claim 6 has the advantage that the connection of the two contacts inside the switch reduces the expenditure for contacting by means of cables or foils.

It is advantageous for reasons of space in devices as defined in claim 7, which comprise a stacking function in addition to the playback function (changer devices), when the transport of the information discs to the turntable can take place in two loading directions. A first loading direction is, for example, the transport of the information disc from an ejection position outside the device onto the turntable, while a second loading direction is, for example, the transport of the information disc from the stacking unit to above the turntable. The exact position of the information disc above the turntable can be detected two-dimensionally by means of the position sensor according to the invention so as to lay the information disc on the turntable subsequently such that the centering pin of the turntable enters the central hole of the information disc.

BRIEF DESCRIPTION OF THE DRAWINGS

A diagrammatically depicted embodiment of the invention will now be explained in more detailed below with reference to the drawings of FIGS. 1 to 3, in which.

DETAILED DESCRIPTION OF THE PREFERRED EMBODIMENTS

Figure 1:
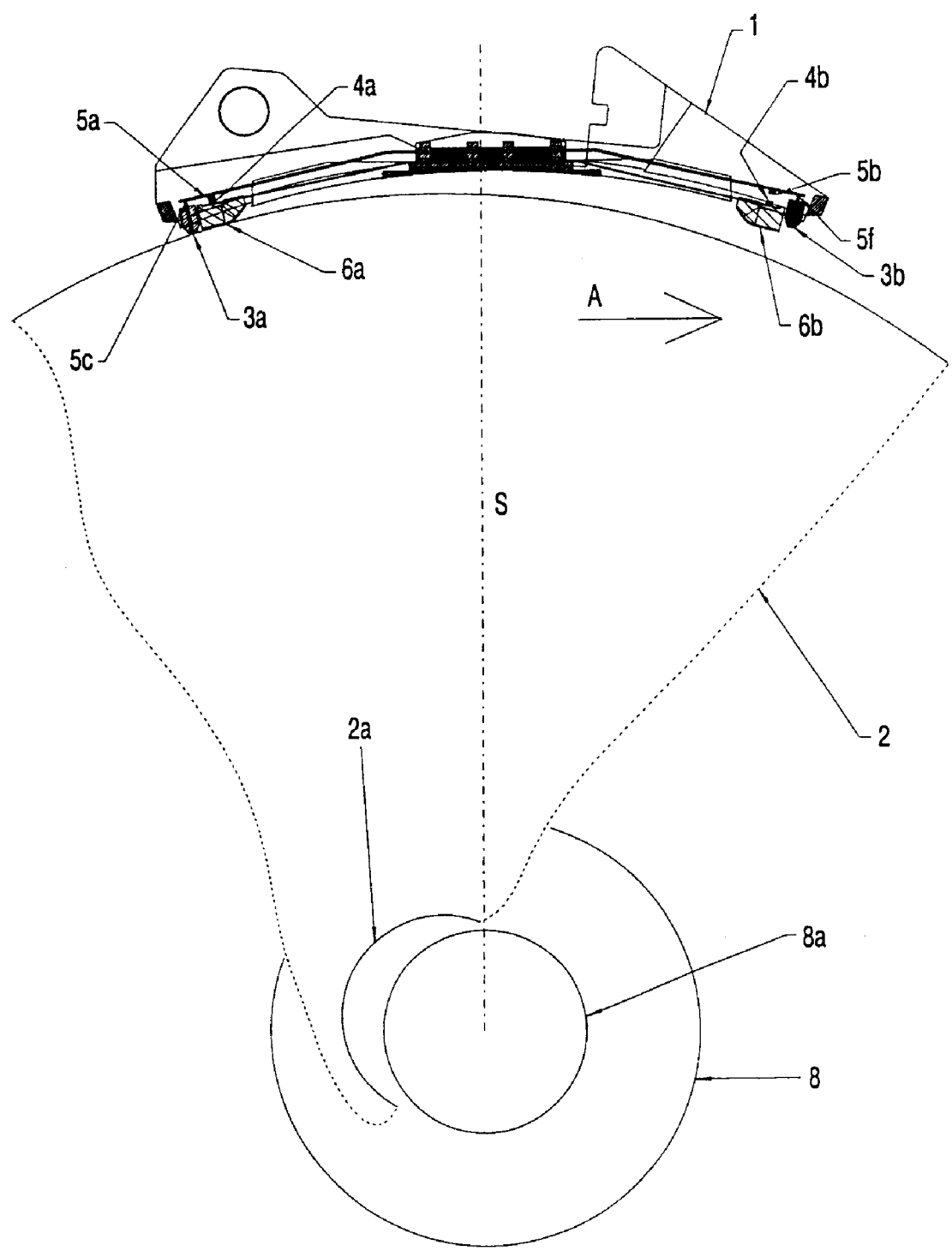
FIG. 1 is a plan view of a position switch for the two-dimensional detection of the position of an information disc.

FIG. 1 shows a position switch 1 which is provided for the exact positioning of an information disc 2 on a turntable 8 of a device for reading information stored on the information disc and/or writing information on the information disc 2.

The position switch 1 comprises as its detection elements a first pair of contacts comprising contact 4a and contact 5a, and a second pair of contacts comprising contact 4b and contact 5b. The contacts 4a/5a and 4b/5b are provided on respective spring arms 5d, 5g. The position switch 1 has reference rims 3a and 3b for the edge of the information disc 2 and reference rims 5c and 5f for the contacts 4a and 5a. The spring arms 5d in their non-operational position bear with force on the reference rims 5c and 5f. Operational elements 6a, 6b, are present at the spring arms 5g, providing a larger effective surface area for the disc edge of the information disc 2.

In FIG. 1, the information disc 2 rolls with its outer edge along the reference rims 3a, thus exactly closing the pair of contacts 4a/5b. The correct position above the turntable 8 is reached when also the second pair of contacts 4b/5b is closed. This happens when the information disc 2 is moved further in the direction of arrow A. The switching points of the contact pairs 4a/5a and 4b/5b are situated such that both switches are operated when the information disc 2 has occupied the correct position above the centering pin 8a of the turntable 8 with its centering hole 2a.

The situation is to be viewed as in a mirror with axis S for the transport of the information disc in the reverse direction.

The information disc 2 can thus be exactly positioned two-dimensionally above the turntable 8 by means of the positioning switch 1.

Figure 2:
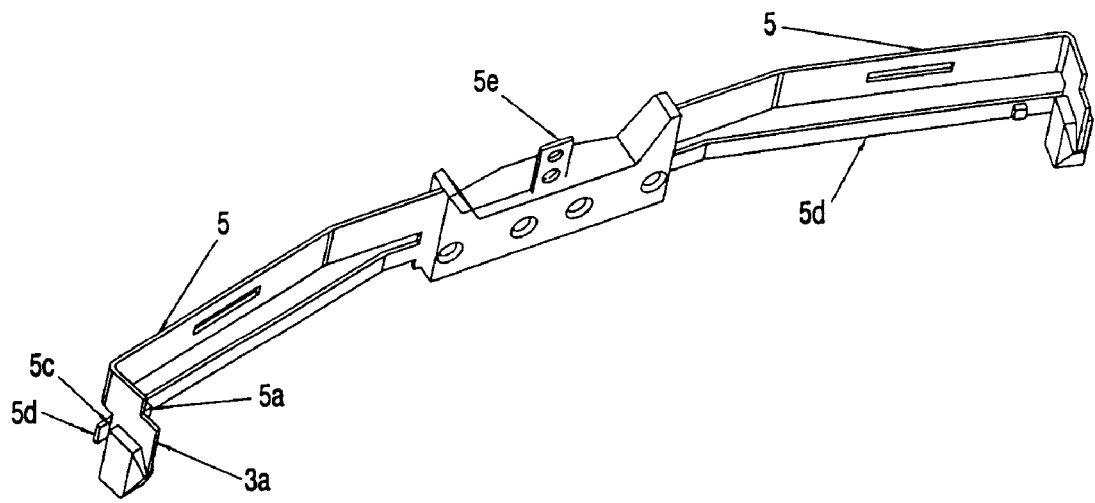
FIG. 2 shows a component of the position switch in perspective view.

FIG. 2 shows the component of the position switch 1, which carries the contacts 4a and 5a in perspective view. The contact 5a is positioned as close as possible to the reference rim 5c so as to keep the influence of the bending of the spring arm 5d small. The reference rim 3a for the information disc 2 lies on the same component as the reference rim 5c, so that the positions of the two reference rims with respect to one another can be manufactured with very narrow tolerance in stamping technology. The same holds for the reference rims 3b and 5f. The advantage of this construction is that the switching point can be maintained very accurately without adjustment. When the switch is operated, the contacts 4a and 4b first abut against the contacts 5a and 5b, respectively, which are supported with force against the reference rims 5c and 5f, whereby the switching point is defined. To achieve a self-cleaning effect of the contacts, it is necessary for the contacts still to move relative to one another after closing. On the other hand, the reference rims 3a and 3b must be kept fixedly positioned with respect to the center of the turntable 8. To comply with both requirements, the component shown in FIG. 2, which comprises the contacts 5a and 5b, the reference rims 5c and 5f, and the reference rims 3a and 3b, is constructed such that the reference rims 5c/5f, 3a/3b are rigidly fastened in the housing of the switch, whereas the spring arms 5d are constructed as additional resilient components.

FIG. 2 furthermore shows a connection 5e, which renders possible the electrical contacting for the two contacts 5a and 5b. The connection of the two contacts 5a and 5b inside the switch reduces the expenditure necessary for contacting by means of cables or foils.

Figure 3:
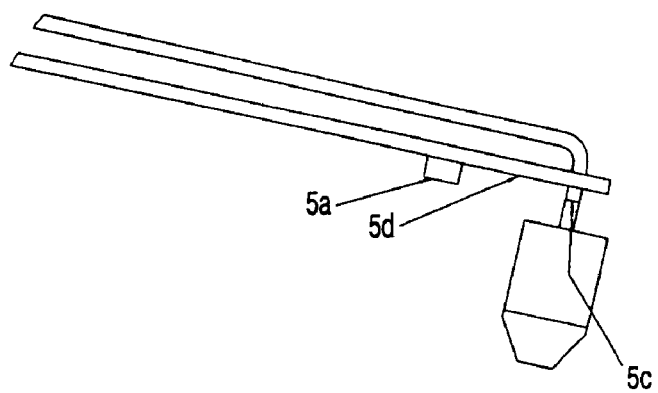
FIG. 3 is an enlarged view of the contacting region of the component of FIG. 2.

FIG. 3 shows a detail of the contacting region with the reference rims. The spring arm 5d is slightly lifted off the reference rim 5c here. This is achieved in that the contact 4a (not shown in FIG. 3) presses against the contact 5a and thus acts on the spring arm 5d.

What is claimed is:

1. A device for at least one of reading information stored on an information disc and writing information on the information disc, wherein the device comprises:
    at least one position switch for recognizing a position of the information disc,
    wherein the position switch comprises at least two detection elements for detecting two reference points arranged on a circumference of a circle whose center corresponds to a center of the information disc in a reference position.

2. A device for at least one of reading information stored on an information disc and writing information on the information disc, wherein the device comprises:
    at least one position switch for recognizing a position of the information disc,
    wherein the position switch comprises at least tow detection elements for detecting two reference points lying on a circumference of a circle having a center corresponding to a center of the information disc when it is in a reference position, each detection element having at least two pairs of contacts with actuator elements for scanning a disc edge of the information disc, while switching points of said pairs of contacts correspond to said reference points.

3. A device as claimed in claim 2, wherein the position switch comprises as its detection elements at least two pairs of optical contacts for scanning the disc edge of the information disc, while the switching points of said pairs of contacts correspond to said reference points.

4. A device as claimed in claim 2, wherein the position switch comprises at least two first reference rims for the edge of the information disc and at least two second reference rims for at least one contact of each of the two pairs of contacts, and in that the first reference rims for the edge of the information disc and the second reference rims for the contacts of the pairs of contacts are arranged on one integral component of the position switch.

5. A device as claimed in claim 4, wherein the two contacts of each pair of contacts are provided on spring arms.

6. A device as claimed in claim 2, wherein one contact of each pair of contacts is connected to a respective contact of the other pair of contacts with electrical conduction.

7. A device as claimed in claim 2, wherein the device is constructed as a changer device and comprises a stacking unit for storage of at least two information plates.

8. A device claimed in claim 1, wherein at least one of the detection elements comprises plurality of electrical contacts capable of detecting an edge of the information disc.

9. A device as claimed in claim 1, wherein at least one of the detection elements comprises a plurality of optical contacts capable of generating a photoelectric barrier and detecting an edge of the information disc when the edge breaks the photoelectric barrier.

10. A device as claimed in claim 1, wherein the reference position comprises a center of a turntable in a playback unit.

11. A device as claimed in claim 2, wherein the reference position comprises a center of a turntable le in a playback unit.

12. A method, comprising:
    detecting a first reference point and a second reference point associated with an information disc; and
    recognizing a position of the information disc based on the detection of the first and second reference points, the first and second reference points arranged on a circumference of a circle whose center corresponds to a center of the information disc in a reference position.

13. A method as claimed in claim 12, wherein detecting the first and second reference points comprises:
    using a plurality of first contacts to detect the first reference point; and
    using a plurality of second contacts to detect the second reference point.

14. A method as claimed in claim 13, wherein:
    the plurality of first contacts comprises a pair of first electrical contacts;
    the plurality of second contacts comprises a pair of second electrical contacts; and
    using the first and second electrical contacts comprises:
        closing the first pair of electrical contacts when an edge of the information disc reaches the first reference point; and closing the second pair of electrical contacts when the edge of the information disc reaches the second reference point.

15. A method as claimed in claim 13, wherein:

the plurality of first contacts are provided on a first spring arm; and the plurality of second contacts are provided on a second spring arm.

16. A method as claimed in claim 12, wherein detecting the first and second reference points comprises:

forming a first photoelectric barrier; and forming a second photoelectric barrier.

17. A method as claimed in claim 16, further comprising:

detecting when an edge of the information disc breaks the first photoelectric barrier; and detecting when the edge of the information disc breaks the second photoelectric barrier.

18. A method as claimed in claim 12, further comprising at least one of reading information from the information disc and writing information to the information disc when the center of the information disc is in the reference position.

19. A method as claimed in claim 12, wherein the first and second reference points comprise mutually distanced reference points along an edge of the information disc.

20. A method as claimed in claim 12, wherein the reference position comprises a center of a turntable in a playback unit.

* * * * *